US011045885B2

(12) United States Patent
Joly et al.

(10) Patent No.: US 11,045,885 B2
(45) Date of Patent: Jun. 29, 2021

(54) FACE MILLING TOOL AND A TANGENTIAL CUTTING INSERT THEREFORE

(71) Applicant: SANDVIK INTELLECTUAL PROPERTY AB, Sandviken (SE)

(72) Inventors: Damien Joly, Saint Avertin (FR); Gilles Marie, Tours (FR); Yannick Sarton, Luynes (FR); Philippe Andre, Amboise (FR); Vincent Lemoine, Notre Dame Doe (FR); Marc Rue, Charentilly (FR)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/339,627

(22) PCT Filed: Jun. 16, 2017

(86) PCT No.: PCT/EP2017/064753
§ 371 (c)(1),
(2) Date: Apr. 4, 2019

(87) PCT Pub. No.: WO2018/065129
PCT Pub. Date: Apr. 12, 2018

(65) Prior Publication Data
US 2019/0232394 A1  Aug. 1, 2019

(30) Foreign Application Priority Data

Oct. 5, 2016  (EP) .................... 16192461

(51) Int. Cl.
B23C 5/06  (2006.01)
B23C 5/22  (2006.01)
(52) U.S. Cl.
CPC .............. B23C 5/06 (2013.01); B23C 5/2221 (2013.01); B23C 5/2234 (2013.01);
(Continued)

(58) Field of Classification Search
CPC .......... B23C 5/06; B23C 5/08; B23C 5/2252; B23C 5/226; B23C 5/2226;
(Continued)

(56) References Cited

U.S. PATENT DOCUMENTS 2,431,581 A * 11/1947 Owen ................... B23C 5/006
407/34
3,670,380 A    6/1972 Moore et al.
(Continued)

FOREIGN PATENT DOCUMENTS

DE  19847227 A1 * 4/2000 ............. B23C 5/207
EP   0222156 A1 * 5/1987 ............. B23C 5/207
(Continued)

Primary Examiner — Ryan C Rufo
(74) Attorney, Agent, or Firm — Corinne R. Gorski

(57) ABSTRACT

A face milling tool includes a tool body having an axial front end surface with several seats. Each seat has support surfaces for rotationally locking and supporting a tangential cutting insert in the seat. One of the support surfaces is a flat axial support surface for supporting the tangential cutting insert in an axial direction defined by the central rotation axis. The flat axial support surface extends perpendicular to the central rotation axis and is situated axially foremost in the seat. A side wall of each seat is formed out of round side support surfaces. Each tangential cutting insert includes an axial back side with a flat axial contact surface abutting the flat axial support surface and a projecting member extending axially from the flat axial contact surface and having a circumferential side surface forming out of round side contact surfaces abutting the out of round side support surfaces.

12 Claims, 7 Drawing Sheets

(52) U.S. Cl.
CPC ............... *B23C 2200/0416* (2013.01); *B23C 2200/367* (2013.01); *B23C 2210/168* (2013.01)

(58) Field of Classification Search
CPC ...... B23C 2200/161; B23C 2200/0416; B23C 2200/125; B23C 2200/367; B23C 2210/244
See application file for complete search history.

(56) References Cited

U.S. PATENT DOCUMENTS

| | | | | |
|---|---|---|---|---|
| 5,607,263 A * | 3/1997 | Nespeta | ............... | B23B 27/007 407/61 |
| 5,667,343 A | 9/1997 | Hessman et al. | | |
| 7,410,331 B2 * | 8/2008 | Ejderklint | ............... | B23C 5/06 407/113 |
| 10,220,450 B2 * | 3/2019 | Zhang | ............... | B23C 5/006 |
| 10,384,275 B2 * | 8/2019 | Deguchi | ............... | B23C 5/06 |
| 2002/0037199 A1 * | 3/2002 | Satran | ............... | B23C 5/1045 407/54 |
| 2003/0223828 A1 * | 12/2003 | Craig | ............... | B23C 5/109 407/35 |
| 2011/0164932 A1 * | 7/2011 | Choi | ............... | B23C 5/06 407/40 |
| 2012/0201622 A1 | 8/2012 | Kocherovsky et al. | | |
| 2015/0003922 A1 * | 1/2015 | Orlov | ............... | B23C 5/109 407/42 |
| 2015/0202791 A1 | 7/2015 | Liu | | |
| 2017/0368615 A1 * | 12/2017 | Yamamoto | ............... | B23C 5/2221 |
| 2019/0118276 A1 * | 4/2019 | Dubs | ............... | B23C 5/24 |

FOREIGN PATENT DOCUMENTS

| | | | | |
|---|---|---|---|---|
| EP | 2127793 A1 * | 12/2009 | ............... | B23C 5/08 |
| FR | 2918909 A1 * | 1/2009 | ............... | B23C 5/04 |
| JP | S6138811 B2 | 9/1986 | | |
| JP | 09155622 A * | 6/1997 | | |
| WO | 2013039090 A1 | 3/2013 | | |

* cited by examiner

FACE MILLING TOOL AND A TANGENTIAL CUTTING INSERT THEREFORE

RELATED APPLICATION DATA

This application is a § 371 National Stage Application of PCT International Application No. PCT/EP2017/064753 filed Jun. 16, 2017 claiming priority to EP 16192461.8 filed Oct. 5, 2016.

TECHNICAL FIELD OF THE INVENTION

The present invention relates to a face milling tool and a tangential cutting insert for such a face milling tool.

Background and Prior Art

In face milling operations there is a demand to improve the surface finish on the machined surface. In particular there is such a demand within the automotive industry in connection with face milling tools used for milling cylinder blocks and similar.

One important requirement for improving the surface finish and extending the tool life in face milling is that of minimizing so called axial run-out on the cutting inserts mounted to the tool body. Such axial run-out is caused by deviations between the axial positions on the cutting edges of the cutting inserts as a result of the manufacturing tolerances of both the cutting inserts and the seats of the tool body. The manufacturing tolerances of the cutting inserts can be minimized by grinding the cutting inserts. However, the axial run-out caused by manufacturing tolerances of the seats for the cutting inserts is more difficult to minimize/eliminate. Consequently, in spite of very good tolerances on the cutting inserts due to grinding, it may be necessary to adjust the milling tool due to inadequate manufacturing tolerances of the seats in the tool body.

Currently, there are many solutions aimed at minimizing or eliminating the axial run-out.

U.S. Pat. No. 5,667,343 discloses one way of solving this problem by providing a face milling tool with cassettes being adjustable in the axial direction of the tool body. The cutting inserts are mounted in seats on the axial front end of the cassettes and each cassette is axially adjusted to minimize/eliminate the axial run-out. However, the process of adjusting the cassette is time consuming and the cassettes can subsequently be displaced by the cutting forces or as a result of an inappropriate mounting of the cassettes.

JP61038811 discloses another way of achieving high accuracy cutting on a milling tool by providing an axial front end surface of the tool body with a recessed guide groove for mounting cutting inserts, wherein a bottom surface of the recessed guide groove is forming an axial support surface for all the cutting inserts. However, the manufacturing of the recessed guide groove with the bottom surface is nevertheless associated with such manufacturing tolerances that may cause axial run-out on the cutting inserts.

SUMMARY OF THE INVENTION

The object of the present invention is to provide a face milling tool and a tangential cutting insert therefore that solves the above mentioned problems with axial run-out caused by the seats for the cutting inserts.

This object is achieved by the face milling tool having a tool body rotatable around a central rotation axis in a direction of rotation. The tool body including an envelope surface concentric with the central rotation axis and an axial front end surface extending transverse to the central rotation axis. The axial front end surface including a plurality of seats and a plurality of tangential cutting inserts mounted in the plurality of seats. Each seat including a plurality of support surfaces for rotationally locking and supporting a tangential cutting insert in a respective seat. One of the plurality of support surfaces is a flat axial support surface for supporting the tangential cutting insert in an axial direction defined by the central rotation axis. The flat axial support surface extends perpendicular to the central rotation axis and is situated axially foremost in the seat. Each seat is provided with a recess in relation to the flat axial support surface. Each recess includes a bottom surface and a side wall. The side wall forms out of round side support surfaces for rotationally locking and supporting the tangential cutting insert in directions perpendicular to the axial direction. Each tangential cutting insert includes an axial back side having a flat axial contact surface abutting the flat axial support surface and a projecting member extending axially from the flat axial contact surface. The projecting member includes a circumferential side surface forming out of round side contact surfaces abutting the out of round side support surfaces. A gap is provided between the bottom surface of the recess and the projecting member of the tangential cutting insert.

The axial run-out of the seats on the axial front end surface of the tool body is hereby easily minimized/eliminated due to the flat and perpendicularly extending axial support surfaces being situated axially foremost in the seats. Any deviations in the axial position between the flat axial support surfaces can in this way be minimized/eliminated by subjecting the seats on the axial front end surface to a single flat grinding operation so that the flat axial support surfaces become situated in a common plane extending perpendicular to the central rotation axis. The tangential cutting inserts with the flat axial contact surfaces abutting the flat axial support surfaces of the seats will hereby exhibit less axial run-out, since the flat axial support surfaces are located in the same axial position. The flat axial support surfaces may either be arranged flush with the axial front end surface of the tool body around the annular track of the seats or they may be arranged on protruding plateaus on the axial front end surface of the tool body. The seat is also provided with the recess forming out of round side support surfaces, wherein the projecting member of the tangential cutting insert is forming the out of round side contact surfaces abutting for rotationally locking and supporting the tangential cutting insert in directions perpendicular to the axial direction, more precisely in a radial and tangential direction of the face milling tool. The "out of round" side support/contact surface should hereby be regarded in a wide sense as meaning surfaces that deviate from a circular design. Hence, the "out of round" side support/contact surfaces include planar or curved surfaces formed to rotationally lock the cutting insert in the seat as well as provide the necessary rectilinear support in the directions (radial and tangential) being perpendicular to the axial direction of the milling tool. A gap is formed between the bottom surface of the recess and the projecting member of the cutting insert in order to secure that only the flat axial contact/support surfaces are abutting each other to provide the precise axial support with minimized/eliminated axial run-out.

The final axial run-out of the complete tool will essentially only depend on the cutting insert tolerance related to the distance between the cutting edge and the flat axial contact surface of the insert. Accordingly, the milling tool of the present invention reduces/eliminates the axial run-out of the seats and there is no time consuming axial adjustment needed by the operator of the face milling tool.

According to an embodiment of the face milling tool, the tool body comprises a replaceable ring shaped member being provided with the seats, wherein the replaceable ring shaped member is mounted to the tool body to form an annular portion comprising the seats on the axial front end surface of the tool body. In this way the ring shaped member can form a spare part for the face milling tool to be replaced in case any of the seats are damaged or worn out. Furthermore, if a specific milling operation would require an increased/decreased number of seats/cutting inserts or if the milling operation requires for instance an uneven distribution (also known as differential pitch) between the seats/cutting inserts, the ring shaped member may hereby be replaced without replacing the entire tool body. The ring shaped member (made of steel) is concentric with the central rotation axis of the milling tool and may be screw mounted onto the tool body. The ring shaped member is provided with the annular track of seats in one of its axial end surfaces with the flat axial support surfaces being ground flat by the flat grinding wheel to minimize/eliminate axial run-out on the flat axial support surfaces. The ring shaped member may be mounted directly onto a flat face of the tool body or it may be mounted in an annular recess/shoulder on the tool body formed with axial and radial shoulder surfaces for supporting the ring shaped member.

In another embodiment of the face milling tool, the tool body is formed in one piece and the flat axial support surfaces of the seats are situated axially foremost on the axial front end surface of the one piece tool body. In other words, when the tool body is formed in one piece, the flat axial support surfaces constitute the axial end surfaces on the entire axial front end surface to enable the single flat grinding operation for minimizing/eliminating the axial run-out on the flat and perpendicularly extending axial support surfaces.

In a further embodiment of the face milling tool, the side wall of the recess is forming clearance spaces between at least two out of round side support surfaces. The clearance spaces are hereby arranged for housing portions of the circumferential side surface of the projecting member that extend between the at least two out of round side support/contact surfaces. A stable and predictable side support for the cutting insert is hereby assured by only allowing the contact surfaces of the projecting member and side support surfaces of the recess to abut each other, whereby the rest of the circumferential side surface of the projecting member runs clear from the side wall of the recess. It is evident that the recess with the side wall (and bottom surface) is required to exhibit a slightly larger dimension than the projecting member to enable an insertion of the projecting member into the recess. This embodiment however also requires that the at least two out of round side support surfaces are protruding from the side wall to form said clearance spaces between said support surfaces.

According to an embodiment of the face milling tool, the out of round side support surfaces in the side wall of the recess are formed by two side support surfaces, wherein the circumferential side surface of the projecting member is forming two out of round side contact surfaces abutting the two side support surfaces. In other words, the side support/contact surfaces constitute exactly two surfaces so that a stable and determined support for the cutting insert is achieved by three surfaces in total (i.e. the flat axial support/contact surface and the two side support/contact surfaces).

According to further embodiment of the face milling tool, the two of round side support surfaces are facing each other and mutually converging in a direction opposite to the direction of rotation of the tool body, wherein the two out of round side contact surfaces extend to mutually converge in the same. In this way the side support/contact surfaces provides a wedge effect during milling whereby the cutting forces will act in the direction of convergence to further push the two side support/contact surfaces together. The angle between the converging side support/contact surfaces may suitably be in the range of 30° 50°.

According to another embodiment of the face milling tool, the tangential cutting insert is being mounted in the seat by means of a screw, which is in engagement with a threaded hole in the bottom surface of the recess, wherein the tangential cutting insert comprises a screw hole extending axially through the tangential cutting insert inside the projecting member. The screw hole is hereby provided axially through the portion of the cutting insert containing the most material, i.e. where the cutting insert is thickest and exhibits relatively high mechanical strength. The projecting member containing the screw hole may preferably constitute a single and centrally located projecting member on the back side of the cutting insert, wherein the flat contact surface extend both in front and behind (as seen in the rotational direction of the milling tool) of the centrally located projecting member in order to provide a stable axial support to the cutting insert in areas both behind and in front of the projecting member containing the screw hole.

According to a further embodiment of this face milling tool, the screw hole has a centre axis being displaced from a geometrical centre of the projecting member to provide a sole mounting orientation of the tangential cutting insert in which the position of the centre axis of the screw hole in relation to the out of round side contact surfaces correspond to the position of a centre axis of the threaded hole in relation to the out of round side support surfaces. In this way it is only possible to mount the cutting insert in one specific or intended orientation in the seat, making it's impossible to mount the cutting insert in a wrong/non-intended orientation in the seat of the tool body.

The object of the invention is also achieved by the tangential cutting insert having an axial direction coinciding with the axial direction of the face milling tool. The tangential cutting insert includes an axial back side having a flat axial contact surface extending perpendicular to the axial direction of the tangential cutting insert. An axial front side forms an axial clearance surface opposite to the flat axial contact surface. A rake face is arranged in a peripheral side surface extending between the flat axial contact surface and the axial clearance surface. A cutting edge is formed at the intersection between the rake face and the axial clearance surface. A positive axial clearance angle is provided by the axial clearance surface sloping toward the flat axial contact surface as it extends from the cutting edge. The axial back side includes a projecting member extending axially from the flat axial contact surface. The projecting member has a circumferential side surface forming out of round side contact surfaces to rotationally lock and support the tangential cutting insert in directions being perpendicular to the axial direction of the tangential cutting insert.

The tangential cutting insert is provided with the corresponding features so that the flat axial support surfaces of the seats can be situated axially foremost and extend in a perpendicular plane to minimize/eliminate the axial run-out of the seats. More precisely, the projecting member with the circumferential side surface forming out of round side contact surfaces makes it possible to rotationally lock and support the tangential cutting insert in radial and tangential directions of the tool body via the out of round side support surfaces being recessed in relation to the flat axial support surfaces. The axial run-out contribution from the tangential cutting inserts are also easily managed by grinding the flat axial contact surface on the back side and/or the cutting edge with its axial clearance surface on the front side to minimize/eliminate deviations in the axial distance between the cutting edges and the flat axial contact surfaces on the tangential cutting inserts.

According to an embodiment of the tangential cutting insert, the circumferential side surface of the projecting member is forming a polygon in a cross section perpendicular to the axial direction, wherein the out of round side contact surfaces are formed along the sides of the polygon. In a further embodiment, the polygonal cross section is square or triangle, which may comprise either straight or arched side surfaces. Preferably the cross section formed by the circumferential side surface is a circular triangle such as a Reuleaux triangle, which will result in a relatively small yet strong cross section being able to carry large cutting forces, while rotationally locking and supporting the tangential cutting insert.

In a further embodiment of the tangential cutting insert, the screw hole is extending axially through the tangential cutting insert from the axial front side to the axial back side, wherein the screw hole is extending inside the projecting member and mouths in an axial back end surface of the projection member. As mentioned above the screw hole is hereby provided axially through the portion of the cutting insert containing the most material where the cutting insert is thickest and exhibits relatively high mechanical strength. The projecting member containing the screw hole preferably constitute a centrally located projecting member on the back side of the cutting insert, wherein the flat contact surface extend both in front and behind (as seen in the rotational direction of the milling tool) of the centrally located projecting member in order to provide a stable axial support to the cutting insert in areas both behind and in front of the projecting member containing the screw hole.

In a further embodiment of the tangential cutting insert, the screw hole has a centre axis being displaced from a geometrical centre of the projecting member to provide a sole mounting orientation of the tangential cutting insert defined by the position of the centre axis of the screw hole in relation to the out of round side contact surfaces. As previously mentioned it is in this way only possible to mount the cutting insert in one specific or intended orientation in the seat, making it's impossible to mount the cutting insert in a wrong/non-intended orientation in the seat of the tool body.

According to another embodiment of the tangential cutting insert, the cutting edge comprises a wiper edge and a main cutting edge, wherein the main cutting edge is inclined in relation to the wiper edge and extending at an entering angle of at most 10°. Such a shape on the cutting edge is particularly suitable when face milling engine blocks, since it results in a high surface finish on the machined surface exhibiting a minimum of burrs, scratches and fritter. The relatively low entering angle is also beneficial in allowing high feed milling resulting in higher productivity. The cutting edge may hereby be formed in a tip made of PCD or CBN material, which is brazed onto the tangential cutting insert (of cemented carbide). Such PCD and CBN material is particularly suitable when face milling in aluminium material, which is increasingly being used for producing relatively light and strong engine blocks.

In a further embodiment of the tangential cutting insert, the wiper edge and the main cutting edge is forming a continuously arched cutting edge. In this way the cutting edge is forming a smooth transition between the wiper edge and main cutting edge without sharp corners that may either break/chip or scratch the machined surface. Hence, it provides a strong cutting edge and a high surface finish. Providing a strong cutting edge is particularly important when using brazed tips of PCD or CBN material, which is a relatively hard and brittle material compared to cemented carbide. The radius of curvature of the wiper edge is typically larger than the radius of curvature of the main cutting edge. Furthermore, the radius of curvature of the main cutting edge may vary along its extension.

BRIEF DESCRIPTION OF THE DRAWINGS

The invention will in the following be described by means of example with reference to the appended drawings, in which.

DETAILED DESCRIPTION OF EMBODIMENTS OF THE INVENTION

Figure 1:
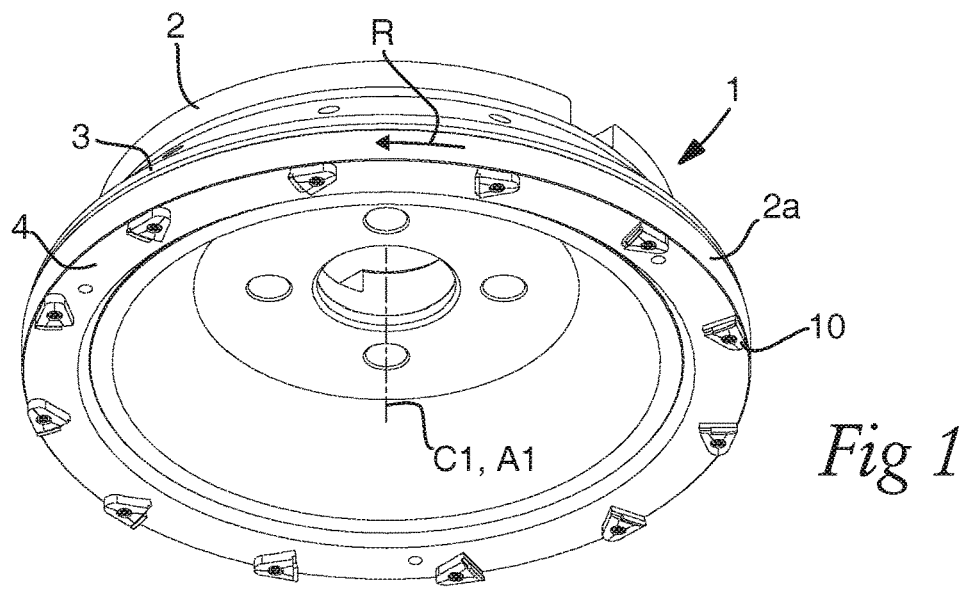
FIG. 1 is a perspective view of a face milling tool according to a first embodiment of the present invention.
Figure 1A:
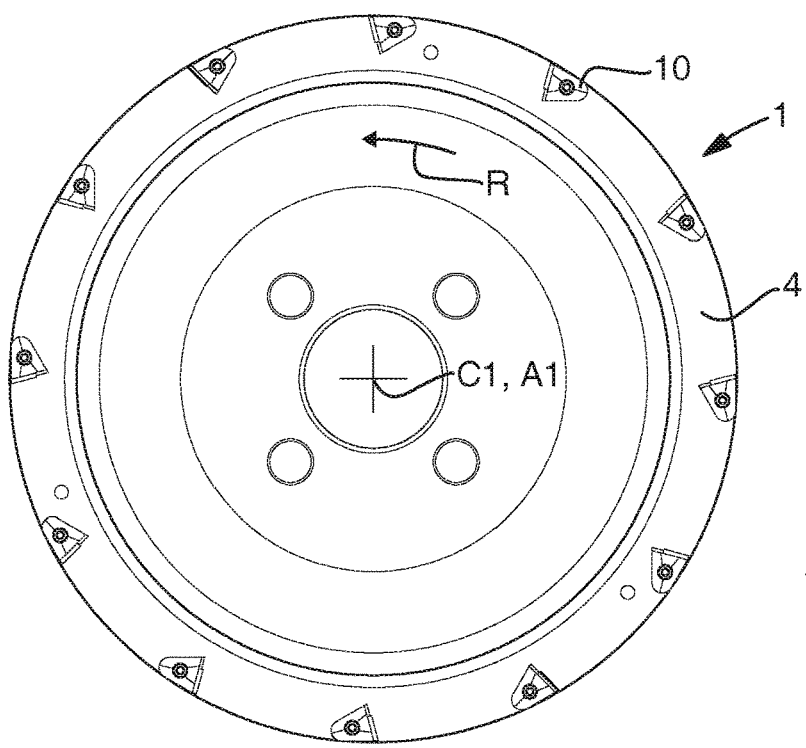
FIG. 1a is a front end view of the face milling tool according to the first embodiment.
Figure 1B:
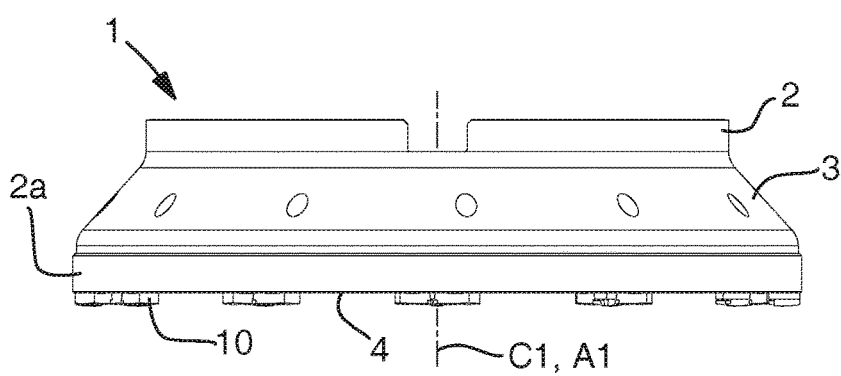
FIG. 1b is a side view of the face milling tool according to the first embodiment.
Figure 1C:
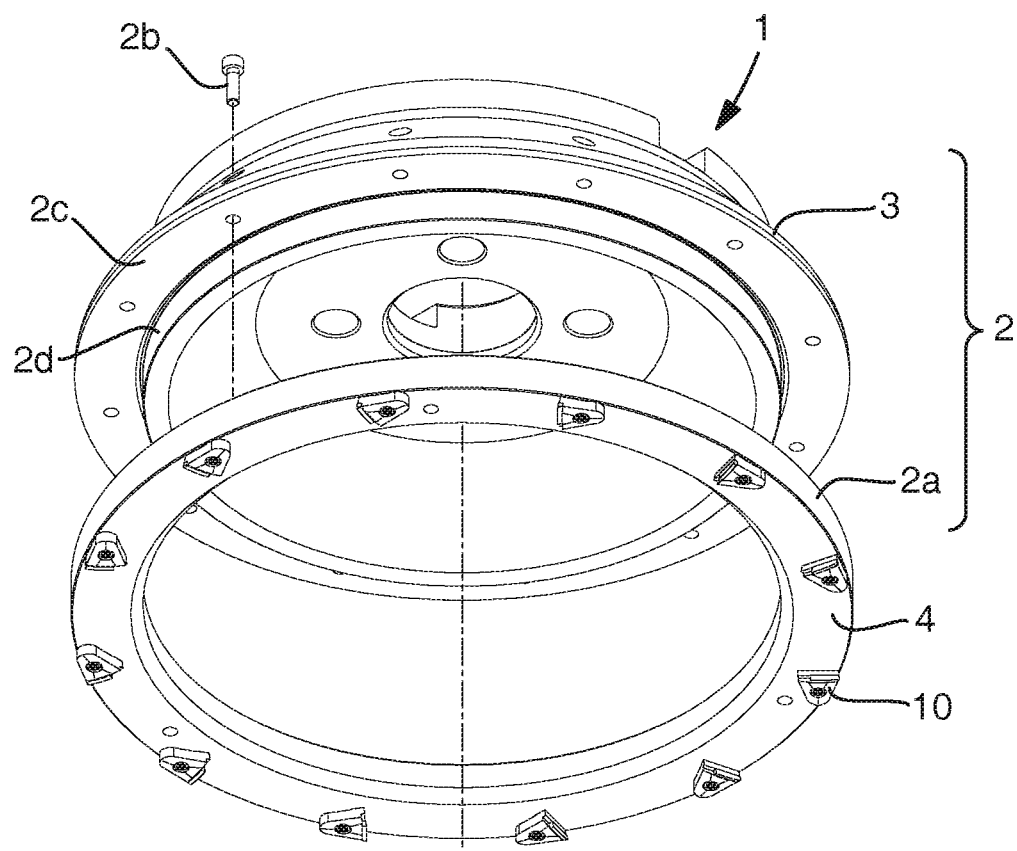
FIG. 1c is an exploded view of the face milling tool according to the first embodiment.

FIGS. 1-1c discloses a first embodiment of a face milling tool 1 for chip removing machining according to the invention. The face milling tool comprises a tool body 2 being rotatable around a central rotation axis C1 in an intended direction of rotation R. The tool body 2 comprises an envelope surface 3 being concentric with the central rotation axis C1 and an axial front end surface 4 extending transverse the central rotation axis C1. The axial front end surface 4 comprises several seats 5 in which a plurality of tangential cutting inserts 10 are mounted.

In the first embodiment a replaceable ring shaped member 2a is provided with the seats 5, wherein the replaceable ring shaped member 2a is mounted to the tool body 2 to form an annular portion/track of seats 5 on the axial front end surface 4 of the tool body. The ring shaped member 2a is concentric with the central rotation axis C1 of the milling tool 1 and mounted by means of screws 2b onto the tool body 2 to form the annular portion/track of seats 5 on the axial front end surface 4 of the tool body 2. The ring shaped member 2a is mounted in an annular shoulder of the tool body being formed with axial and radial shoulder surfaces 2c, 2d for supporting the ring shaped member 2a.

Figure 2:
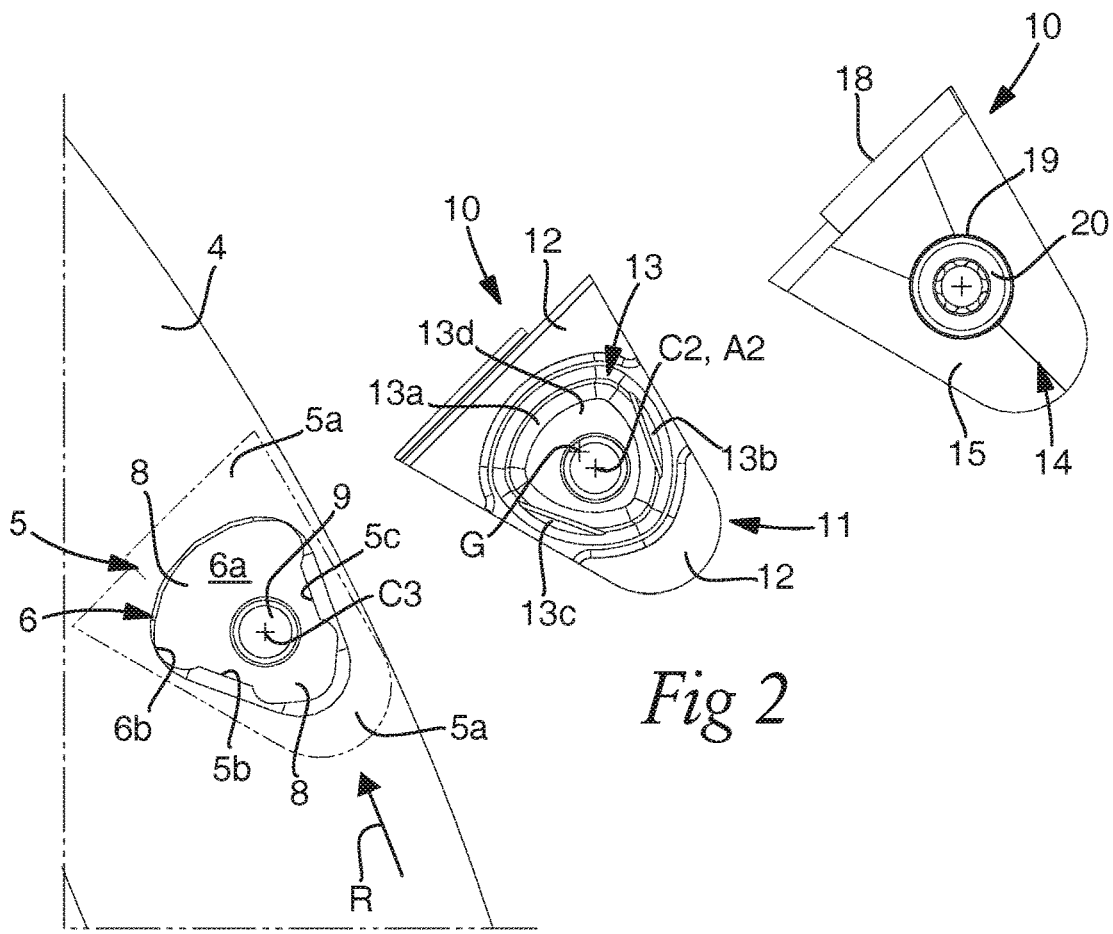
FIG. 2 is an enlarged portion of the face milling tool showing a seat and a tangential cutting insert to be mounted in the seat.
Figure 2A:
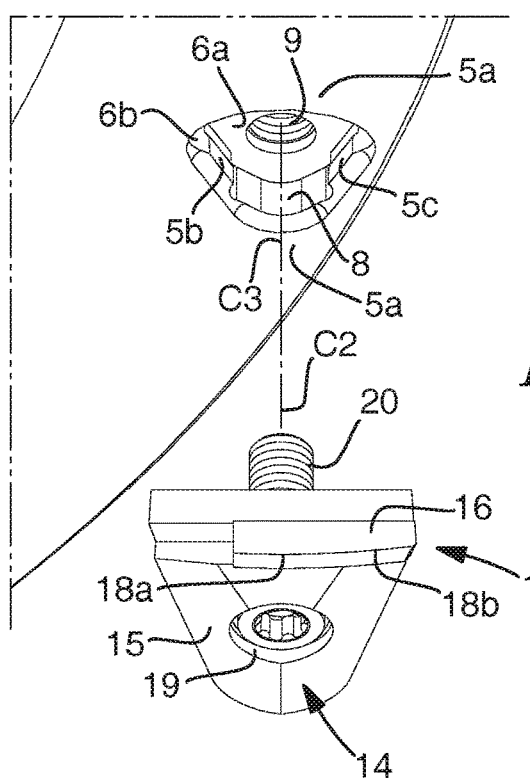
FIG. 2a is an exploded view of the seat with the tangential cutting insert.

FIGS. 2 and 2a discloses the seat 5 and different views of the tangential cutting insert to be mounted therein. The seat comprises several support surfaces 5a, 5b, 5c for rotationally locking and supporting the tangential cutting insert 10. One of the support surfaces is a flat axial support surface 5a for supporting the tangential cutting insert 10 in an axial direction A1 defined by the central rotation axis C1 of the tool body. The flat axial support surfaces 5a are extending perpendicular to the central rotation axis C1 and are situated axially foremost in the seats 5. The flat axial support surfaces 5a of the seats are arranged flush with the axial front end surface 4, wherein the seat 5 is provided with a recess 6 in relation to the flat axial support surface 5a. The recess 6 comprises a bottom surface 6a and a side wall 6b. The side wall 6b is forming out of round side support surfaces 5b, 5c for rotationally locking the tangential cutting insert 10 and supporting the tangential cutting insert 10 in directions perpendicular to the axial direction A1 (in radial and tangential directions of the face milling tool). More precisely, the out of round side support surfaces 5b, 5c in the side wall are formed by two (planar) side support surfaces 5b, 5c, which face each other and mutually converge in a direction opposite to the direction of rotation R of the tool body 2. The angle between the converging side support surfaces is in this specific embodiment 34°.

The tangential cutting insert 10 comprises an axial back side 11 having a flat axial contact surface 12 abutting the flat axial support surface 5a of the seat. The back side of the tangential cutting insert comprises a projecting member 13 extending axially from the flat axial contact surface 12. The projecting member 13 comprises a circumferential side surface 13a forming out of round side contact surfaces 13b, 13c for abutting the out of round side support surfaces 5b, 5c. More precisely, the out of round side contact surfaces are formed by two planar side contact surfaces 13b, 13c that extend to mutually converge in the direction opposite to intended direction of rotation R of the tool body 2 (i.e. in the same manner as the side support surfaces 5b, 5c). The angle between the converging side contact surfaces is in this specific embodiment 34°.

Figure 2B:
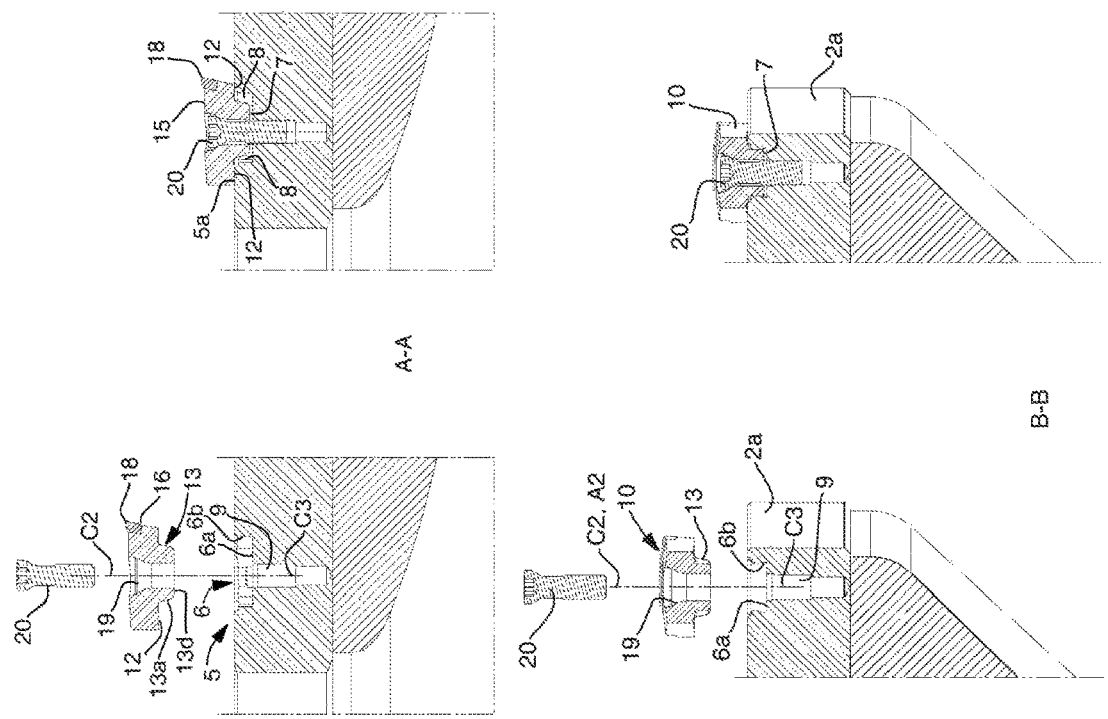
FIG. 2b is a front view of a face milling tool according to a second embodiment of the present invention with two cross sections A-A and B-B of the tangential cutting insert mounted in the seat.
Figure 2B:
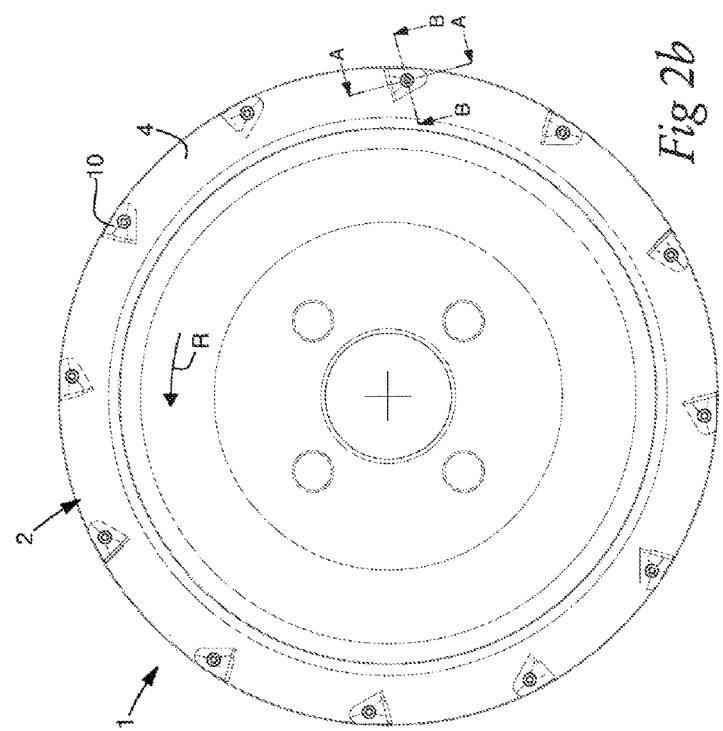

FIG. 2b discloses a front view of a face milling tool 1 according to a second embodiment of the present invention with two cross sections A-A and B-B of the tangential cutting insert 10 mounted in the seat 5. The second embodiment of the face milling tool 1 differs from the first embodiment only in that the tool body 2 is formed in one piece. Hence, the tool body 2 does not have replaceable the ring shaped member 2a. The flat axial support surfaces 5a of the seats 5 are situated axially foremost on the axial front end surface 4 of the one piece tool body 2.

In cross sections A-A and B-B it can be seen that a gap 7 is provided between the bottom surface 6a of the recess 6 and an axial back end surface 13d of the projecting member 13. In other words, the axial extension of the projecting member 13 is less than the axial extension (depth of) the recess 6 to ensure that the projecting member 13 is out of contact with the bottom surface 6a of the recess and that only the flat axial support/contact surfaces 5a, 12 are abutting each other for a well-defined axial support of the tangential cutting inserts 10.

The side wall 6b of the recess 6 is furthermore forming clearance spaces 8 between the two side support surfaces 5b, 5c (see also FIGS. 2 and 2a). Hence, the side support surfaces 5b, 5c are protruding from the side wall 6b of the recess 6, wherein the clearance spaces 8 are housing portions of the circumferential side surface 13a of the projecting member 13 that extend between the two side contact surfaces 13b, 13c to ensure that only the side support/contact surfaces 5b, 5c, 13b, 13c are abutting each other. A well-defined rotational and radial/tangential support for the cutting insert 10 is hereby achieved as the clearance spaces 8 ensure that the rest of the circumferential side surface 13a of the projecting member 13 is out of contact with the remaining portions of the side wall 6b of the recess 6.

The tangential cutting insert 10 is mounted in the seat 5 by means of a screw 20 being in engagement with a threaded hole 9 in the bottom surface 6a of the recess 6. The tangential cutting insert is provided with a screw hole 19 extending axially through the tangential cutting insert from the axial front side 14 to the axial back side 11. The screw hole 19 is extending inside the projecting member 13 and mouths in the axial back end surface 13d of the projection member 13. The tangential cutting insert 10 is mounted by screwing the screw 20 into the threaded hole 9 in the bottom surface 6a of the recess so that the flat axial contact surface 12 and the side contact surfaces 13b, 13c are pressed against the flat axial support surface 5a and the side support surfaces 5b, 5c respectively. The distances between a centre C2 of the screw hole 19 and the side contact surfaces 13b, 13c may hereby be slightly larger than the distances between the centre C3 of the threaded hole 9 and the side support surfaces 5b, 5c so that the screw 20, being made of steel, provides a spring bias due to its elasticity pressing the side contact surfaces 13b, 13c against the side support surfaces 5b, 5c. In other words, the centre axis C2 of the screw hole 19 and the centre axis C3 of the threaded hole are slightly offset (typically by fractions of a millimetre) to provide the spring bias of the mounting screw 20.

Furthermore, the centre axis C2 of the screw hole 19 is displaced from a geometrical centre G of the projecting member 13 to provide a sole mounting orientation of the tangential cutting insert 10 in which the position of the centre axis C2 of the screw hole in relation to the two side contact surfaces 13b, 13c correspond to the position of a centre axis C3 of the threaded hole 9 in relation to the two side support surfaces 5b, 5c. More precisely, the sole mounting orientation is such that the tangential cutting insert 10 have a rake surface 16 with cutting edge 18 facing the direction of rotation R. In other words, the tangential cutting insert cannot be mounted to face in the wrong/non-intended direction of rotation of the tool body.

Figure 3:
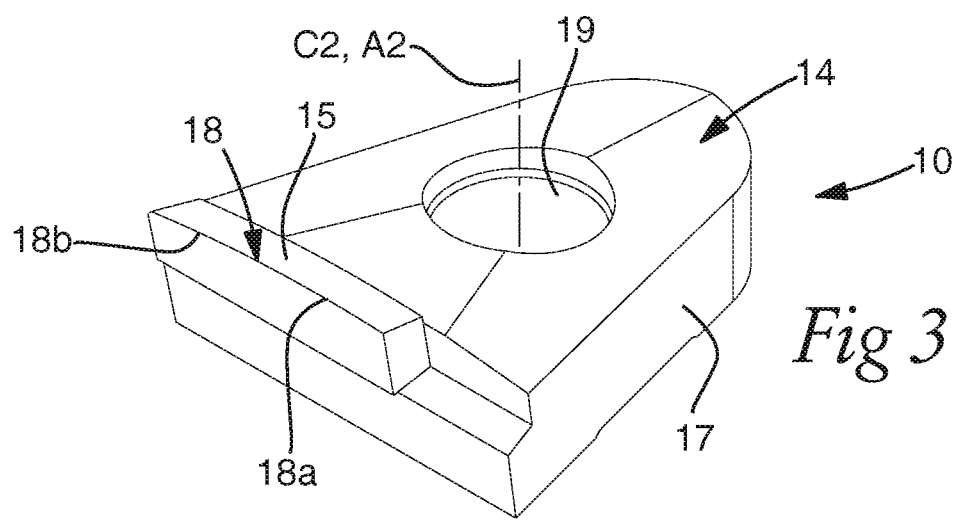
FIG. 3 is a perspective axial front side view of a tangential cutting insert of the present invention.
Figure 3A:
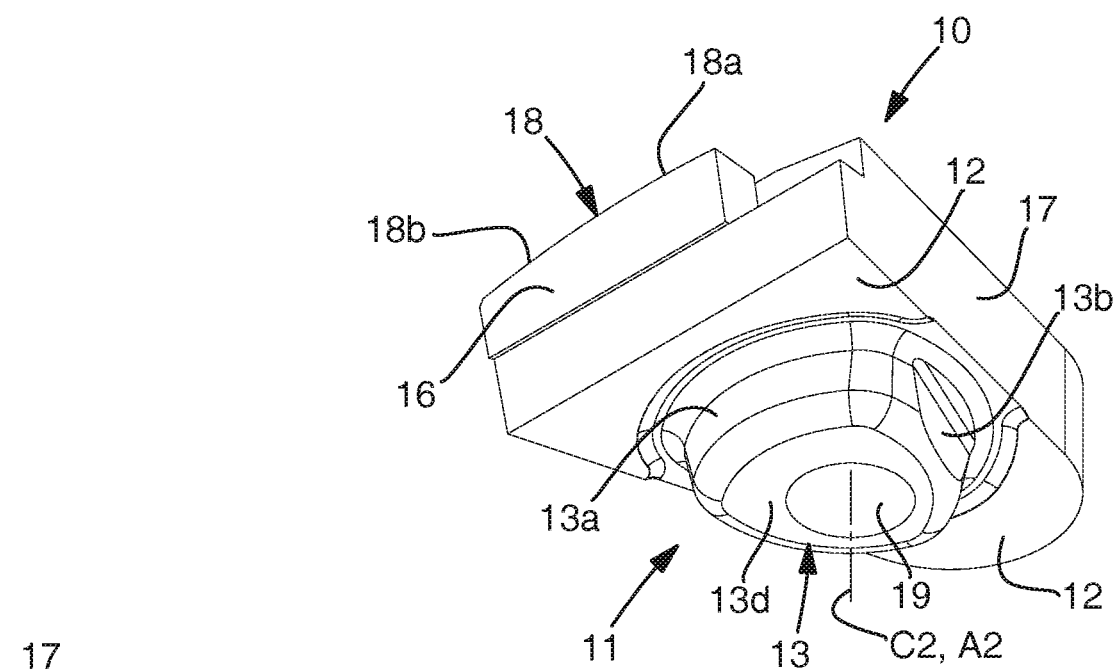
FIG. 3a is a perspective axial back side view of the tangential cutting insert.
Figure 3B:
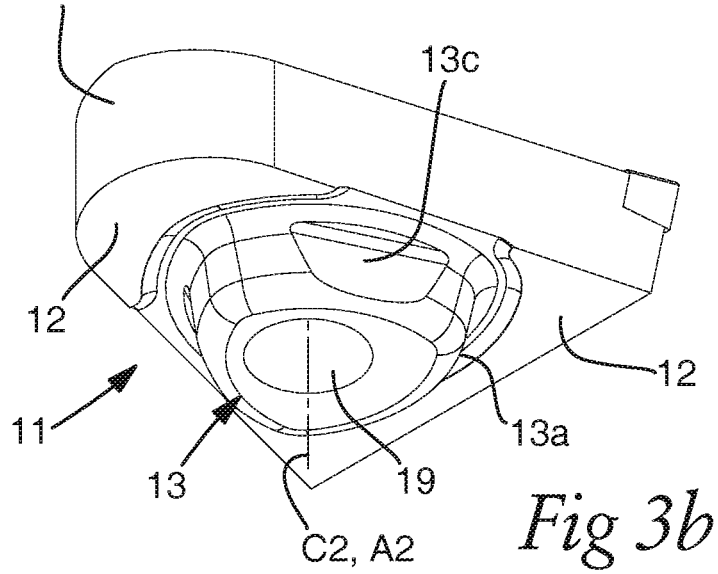
FIG. 3b is another perspective axial back side view of the tangential cutting insert.
Figure 3C:
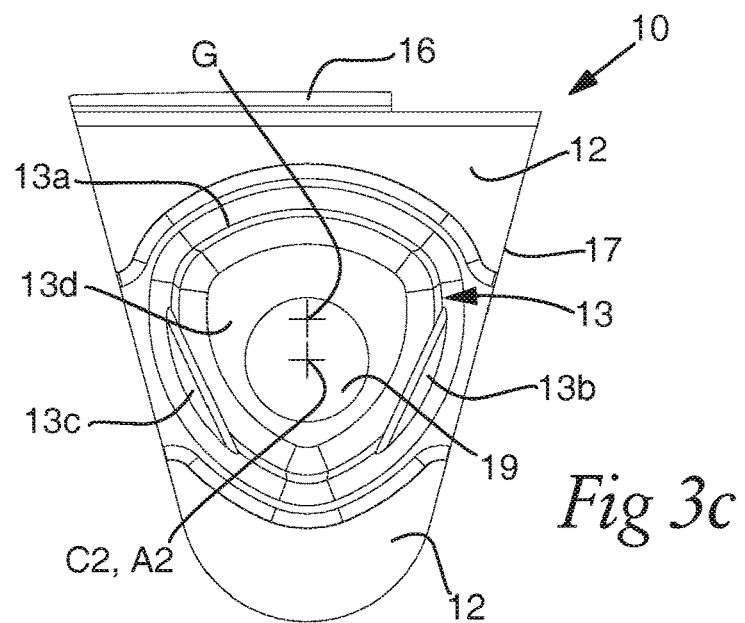
FIG. 3c is an axial back side view of the tangential cutting insert.
Figure 3D:
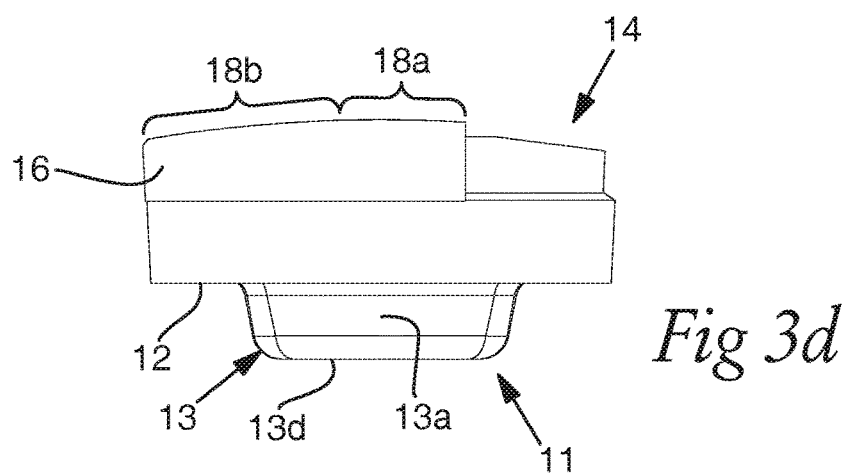
FIG. 3d is a front side view toward a rake face of the tangential cutting insert.
Figure 3E:
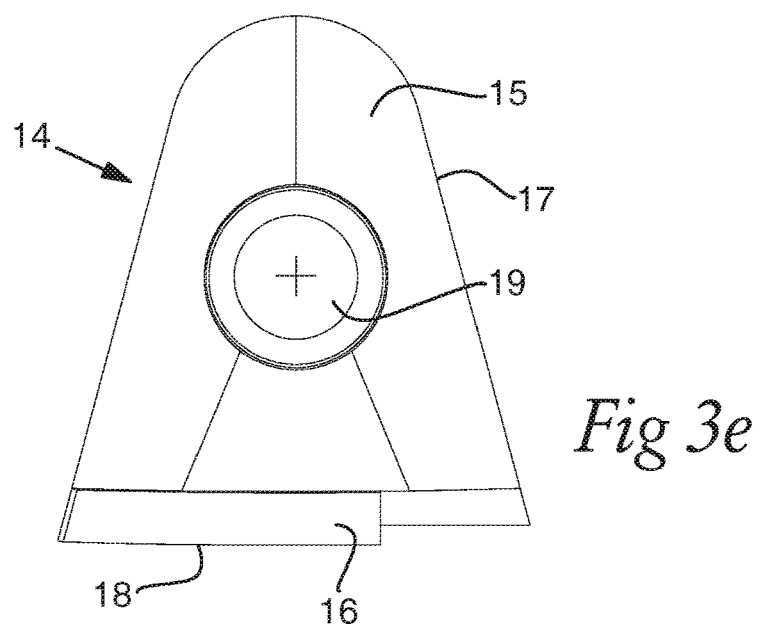
FIG. 3e is an axial front side view of the tangential cutting insert.
Figure 3F:
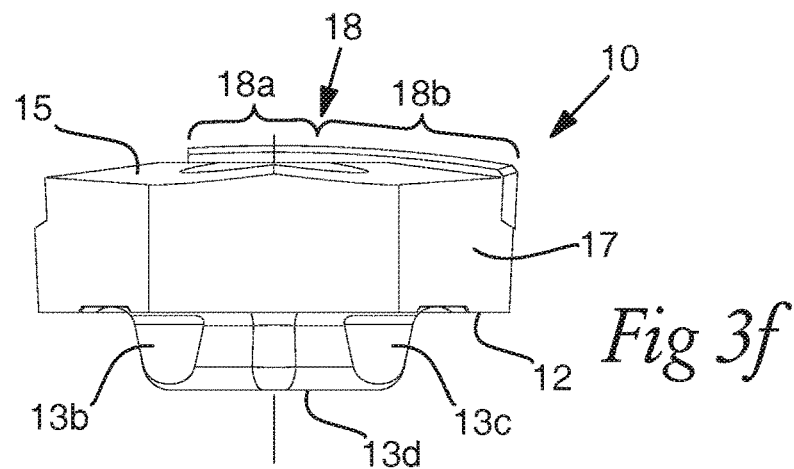
FIG. 3f is a back side view of the tangential cutting insert.
Figure 3G:
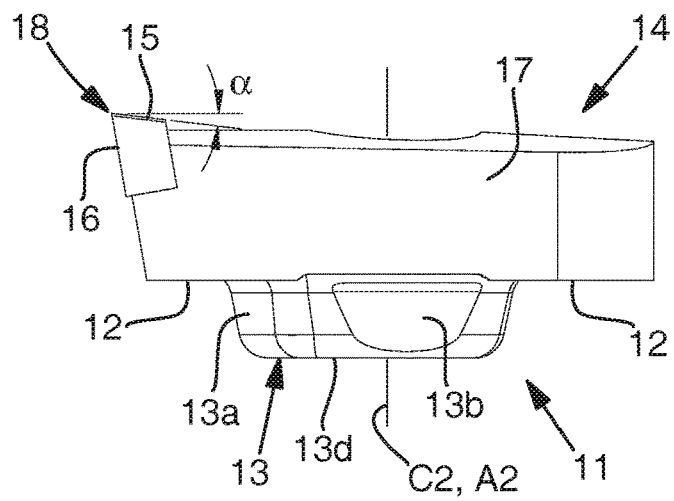
FIG. 3g is a longitudinal side view of the tangential cutting insert.
Figure 3H:
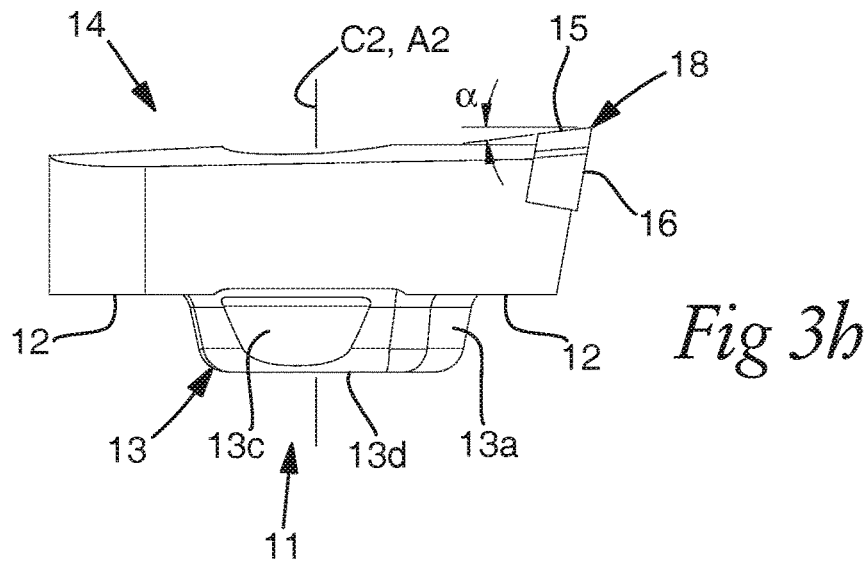
FIG. 3h is a longitudinal side view of the tangential cutting insert.

FIGS. 3 to 3h disclose different views of the tangential cutting insert 10. The tangential cutting insert comprises an axial direction A2 coinciding with both the centre axis C2 of the screw hole 19 and the axial direction A1 of the face milling tool 1. The tangential cutting insert 10 comprises the axial back side 11 having the flat axial contact surface 12 extending perpendicular to the axial direction A2. The projecting member 13 on the axial back side 11 is extending axially in relation to the flat axial contact surface 12. The projecting member 13 comprises the circumferential side surface 13a forming the out of round (in this case planar) side contact surfaces 13b, 13c to rotationally lock and support the tangential cutting insert in directions being perpendicular to the axial direction A2 (i.e. in the radial and tangential direction of the face milling tool). The circumferential side surface 13a of the projecting member 13 is hereby forming a polygon in a cross section perpendicular to the axial direction A2. More precisely, the polygon has the form of a convex circular triangle (a Reuleaux triangle) with the two planar side contact surfaces 13b, 13c being formed along two convex sides of the convex triangular cross section. As can be seen, the back side 11 is hereby provided with a single and centrally located projecting member 13, wherein the flat contact surface 12 extend both in front and behind (as seen in the rotational direction of the milling tool) of the centrally located projecting member 13. The projecting member 13 comprises a tapering shape in the axial extension away from the flat axial contact surface 12 to the axial back end surface 13d of the projecting member 13, wherein the axial back end surface 13d is a planar surface.

An axial front side 14 of the tangential cutting insert 10 is forming an axial clearance surface 15 opposite to the flat axial contact surface 12. A peripheral side surface 17 is hereby extending between the flat axial contact surface 12 and the axial clearance surface 15, wherein a rake face 16 is arranged in the peripheral side surface 17 and a single cutting edge 18 is formed at the intersection between the rake face 16 and the axial clearance surface 15. A positive axial clearance angle α is provided by the axial clearance surface 15 sloping toward the flat axial contact surface 12 as it extends from the cutting edge 18 (see in particular FIGS. 3g and 3h). The sloping axial clearance surface is necessary to provide an axial clearance behind the cutting edge when face milling, since the flat axial support/contact surface 5a, 12 is extending perpendicularly to the axial direction A1, A2. The axial clearance surface 15 is hereby sloping in the entire extension along a longitudinal side view of the tangential cutting insert (see FIGS. 3g and 3h). The most significant clearance angle α is however provided directly behind the cutting edge 18 to provide the necessary axial clearance behind the cutting edge 18.

The cutting edge 18 comprises a wiper edge 18a connected to a main cutting edge 18b (see in particular FIGS. 3d and 3f). The main cutting edge 18b is inclined in relation to the wiper edge 18a and is extending at an entering angle of at most 10°. As can be seen, the wiper edge 18a and the main cutting edge 18b is hereby forming a continuously arched cutting edge 18, wherein the radius of curvature of the wiper edge 18a is larger than the radius of curvature of the main cutting edge 18b. Furthermore, the tangential cutting insert of the present embodiment is made of cemented carbide and is provided with a brazed tip of PCD or CBN material, which tip is forming the cutting edge 18 and a portion of the rake surface 16 and the clearance surface 15. Incorporating such a tip of PCD or CBN is a particularly useful when face milling in aluminium.

As previously mentioned the invention makes it possible to manage any deviations in the axial position between the flat axial support surfaces by subjecting the seats 5 on the axial front end surface 4 to a single flat grinding operation so that the flat axial support surfaces 5a become situated in a common plane extending perpendicular to the central rotation axis C1.

The final axial run-out of the milling tool also depends on the insert tolerances. As also previously mentioned the axial run-out contribution from the tangential cutting inserts 10 are also easily managed by grinding the flat axial contact surface 12 on the back side 11 and/or the cutting edge 18 with its axial clearance surface 15 on the front side 14 to minimize/eliminate deviations in the axial distance between the cutting edges 18 and the flat axial contact surfaces 12 on the tangential cutting inserts 10. The wiper edge 18a of the embodiment is hereby situated axially foremost (or furthest away from the flat axial contact surface 12) on the axial front side 14 of the tangential cutting insert 10 (the main cutting edge 18b is forming a setting angle in relation to the wiper edge 18a). The axial run-out of the cutting insert is hereby easily managed (i.e. minimized/eliminated) by grinding the cutting insert 10 to minimize/eliminate the variations in distances between the flat axial contact surface 12 and the wiper edge 18a of the tangential cutting insert 10. No other insert tolerances will contribute to the final axial run-out of the face milling tool.

The embodiment is specifically developed for face milling of so called bi-metal engine blocks (where some parts are of aluminium and other parts are of cast iron). It hereby reduces problems of scratches, burrs of in the machined aluminium parts and flaking/frittering of the cast iron edges in the bi-metal engine block. However, the present invention is applicable in face milling in general, whereby improvements in the surface finish can be achieved by reducing/eliminating the axial run-out on the milling tool.

The invention is not limited to the embodiments described above and shown in the drawings. Hence, the axial clearance surface 15 does not have to slope in its entire extension along the longitudinal side view of the cutting insert. Instead it may only slope a portion behind the cutting edge, wherein the remaining axial clearance surface is for instance extending in parallel with the flat axial contact surface. The tangential cutting insert of the embodiment is a single sided cutting insert with a single cutting edge arranged on the axial front side. However, the tangential cutting insert may be double-sided with a single cutting edge also on the back side of the tangential cutting insert. In this case a portion of the axial clearance surface is necessarily formed as the flat axial contact surface, so that the tangential cutting insert can be turned over and mounted with the flat axial contact surface on the axial front side against the flat axial support surface in the seat when the cutting edge on the axial front side is worn out. The cutting edge may also be formed on a projecting member forming a projecting cutting head with one side carrying the cutting edge/rake face and opposite sides comprising side contact surfaces for abutting the side support surfaces of the seat. Such projecting member/cutting heads may extend axially on both the front side and axial back side of the tangential cutting insert, wherein the projecting member/cutting head on the axial back side is recessed in the seat in the mounted condition.

The invention claimed is:

1. A face milling tool for chip removing machining comprising: a tool body being rotatable around a central rotation axis in a direction of rotation, the central rotation axis defining an axial forward-rearward direction, the tool body including an envelope surface being concentric with the central rotation axis and an axial front end surface extending transverse to the central rotation axis, the axial front end surface being the axially forward-most surface of the tool body, the axial front end surface having a plurality of seats; and a plurality of tangential cutting inserts, each of the plurality of tangential cutting inserts being mounted in corresponding ones of the plurality of seats, each of the plurality of seats including a plurality of support surfaces for rotationally locking and supporting one of the plurality of tangential cutting inserts respectively in one of the plurality of seats, one of the plurality of support surfaces of each of the plurality of seats being a flat axial support surface for supporting one of the plurality of tangential cutting inserts in an axial direction defined by the central rotation axis, the flat axial support surface of each of the plurality of seats extending perpendicular to the central rotation axis and situated at an axially forward-most portion of the tool body at the axial front end surface, the flat axial support surface being co-planar with the axial front end surface, wherein each seat of the plurality of seats is provided with a recess in relation to the flat axial support surface, the recess including a bottom surface and a side wall, the side wall forming non-circular side support surfaces for rotationally locking and supporting one of the tangential cutting inserts in a direction perpendicular to the axial direction, each of the plurality of tangential cutting inserts including an axial back side having a flat axial contact surface abutting the flat axial support surface and a projecting member extending axially from the flat axial contact surface, the projecting member including a circumferential side surface forming non-circular side contact surfaces abutting the non-circular side support surfaces, wherein a gap is provided between the bottom surface of the recess and the projecting member of the tangential cutting insert mounted in a respective seat, wherein there are exactly two non-circular side support surfaces in the side wall of the recess, wherein the circumferential side surface of the projecting member forms exactly two non-circular side contact surfaces abutting the exactly two non-circular side support surfaces.

2. The face milling tool of claim 1, wherein the tool body includes a replaceable ring shaped member provided with the plurality of seats.

3. The face milling tool of claim 1, wherein the tool body is formed in one piece.

4. The face milling tool according to claim 1, wherein the side wall of the recess forms clearance spaces between the exactly two non-circular side support surfaces.

5. The face milling tool of claim 1, wherein the exactly two non-circular side support surfaces face each other and mutually converge in a direction opposite to the direction of rotation of the tool body, and wherein the exactly two non-circular side contact surfaces extend to mutually converge in the same manner as the non-circular side support surfaces.

6. The face milling tool according to claim 1, wherein one of the tangential cutting inserts is mounted in one of the seats by means of a screw, which is in engagement with a threaded hole in the bottom surface of the recess, the one of the tangential cutting inserts including a screw hole extending axially therethrough inside the projecting member.

7. The face milling tool of claim 6, wherein the screw hole has a center axis displaced from a geometrical center of the projecting member to provide a sole mounting orientation of the one of the tangential cutting inserts in which the position of the center axis of the screw hole in relation to the non-circular side contact surfaces corresponds to a position of a center axis of the threaded hole in relation to the non-circular side support surfaces.

8. The face milling tool of claim 1, each of the plurality of tangential cutting inserts comprises:
    the flat axial contact surface extending perpendicular to the axial direction;
    an axial front side forming an axial clearance surface opposite to the flat axial contact surface;
    a rake face arranged in a peripheral side surface extending between the flat axial contact surface and the axial clearance surface;
    a cutting edge formed at an intersection between the rake face and the axial clearance surface; and
    a positive axial clearance angle provided by the axial clearance surface sloping toward the flat axial contact surface as it extends from the cutting edge.

9. The face milling tool of claim 8, wherein a screw hole extends axially through each of the plurality of tangential cutting inserts from the axial front side to the axial back side, wherein the screw hole extends through the projecting member.

10. The face milling tool of claim 9, wherein the screw hole has a center axis displaced from a geometrical center of the projecting member to provide a sole mounting orientation of each of the plurality of tangential cutting inserts defined by a position of the center axis of the screw hole in relation to the non-circular contact surfaces.

11. The face milling tool of claim 8, wherein the cutting edge includes a wiper edge connected to a main cutting edge, the main cutting edge being inclined in relation to the wiper edge and extending at an entering angle of at most 10°.

12. The face milling tool of claim 11, wherein the wiper edge and the main cutting edge form a continuously arched cutting edge.

* * * * *